(12) United States Patent
Yacobi

(10) Patent No.: US 7,177,442 B2
(45) Date of Patent: *Feb. 13, 2007

(54) METHODS AND SYSTEMS FOR FINGERPRINTING DIGITAL DATA

(75) Inventor: Yacov Yacobi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

This patent is subject to a terminal disclaimer.

(21) Appl. No.: 10/673,970

(22) Filed: Sep. 29, 2003

(65) Prior Publication Data

US 2004/0071314 A1 Apr. 15, 2004

Related U.S. Application Data

(63) Continuation of application No. 09/437,713, filed on Oct. 28, 1999, now Pat. No. 6,754,364.

(51) Int. Cl.
*G06K 9/00* (2006.01)

(52) U.S. Cl. .................................. 382/100

(58) Field of Classification Search ............... None
See application file for complete search history.

(56) References Cited

U.S. PATENT DOCUMENTS

| 5,313,633 A | | 5/1994 | Tomita et al. | |
|---|---|---|---|---|
| 5,665,018 A | * | 9/1997 | Miyata | 474/74 |

(Continued)

FOREIGN PATENT DOCUMENTS

EP 0951183 A2 10/1999

(Continued)

OTHER PUBLICATIONS

Yamamoto et al, "A Method of Image Watermarking which can Detect all Illegal Users in Collusion", 1998 Symposium on Cryptography and Information Security, Hammanako, Japan, Jan. 28-31, 1998, English language translation.*

(Continued)

*Primary Examiner*—Bhavesh M Mehta
*Assistant Examiner*—Christopher Lavin
(74) *Attorney, Agent, or Firm*—Lee & Hayes, PLLC

(57) ABSTRACT

Methods and systems for fingerprinting digital data are described. In the described embodiment, Direct Sequence Spread Spectrum (DSSS) technology is utilized. Unique fingerprinting words are defined where each includes at least one spread sequence. In one embodiment, a fingerprinting word comprises a plurality symbols, called "$\Gamma$ symbols." Each $\Gamma$ symbol is composed of $2c-1$ blocks, where c represents the number of colluders that are desired to be protected against. Each block contains d spread sequence chips. The fingerprinting words are assigned to a plurality of entities to which protected objects embedded with the fingerprinting words are to be distributed. To ascertain the identity of an entity that has altered its unique fingerprinting word, the relative weight of each block is computed in accordance with a defined function and blocks whose weights satisfy a predetermined relationship are "clipped" to a so-called working range. Each $\Gamma$-symbol of the altered fingerprinting word is then processed to produce a set of one or more colors that might be the subject of a collusion. Each $\Gamma$-symbol in the fingerprinting word for each entity is then evaluated against a corresponding produced set and the entity having the most overall $\Gamma$-symbol coincidences is incriminated.

15 Claims, 5 Drawing Sheets

U.S. PATENT DOCUMENTS

| | | | |
|---|---|---|---|
| 5,802,511 A | 9/1998 | Kouchi et al. | |
| 5,812,134 A | 9/1998 | Pooser et al. | |
| 5,859,978 A | 1/1999 | Sonderegger et al. | |
| 5,875,446 A | 2/1999 | Brown et al. | |
| 5,930,369 A | 7/1999 | Cox et al. | |
| 5,970,496 A | 10/1999 | Katzenberger | |
| 6,064,764 A | 5/2000 | Bhaskaran et al. | |
| 6,219,053 B1 | 4/2001 | Tachibana et al. | |
| 6,223,145 B1 | 4/2001 | Hearst | |
| 6,243,480 B1 | 6/2001 | Zhao et al. | |
| 6,285,366 B1 | 9/2001 | Ng et al. | |
| 6,289,382 B1 | 9/2001 | Bowman-Amuah | |
| 6,317,749 B1 | 11/2001 | Ghatate | |
| 6,345,100 B1 | 2/2002 | Levine | |
| 6,345,104 B1 | 2/2002 | Rhoads | |
| 6,434,564 B2 | 8/2002 | Ebert | |
| 6,442,557 B1 | 8/2002 | Buteau et al. | |
| 6,463,420 B1 | 10/2002 | Guidice et al. | |
| 6,489,970 B1 | 12/2002 | Pazel | |
| 6,556,984 B1 | 4/2003 | Zien | |
| 6,564,263 B1 | 5/2003 | Bergman et al. | |
| 6,636,250 B1 | 10/2003 | Gasser | |
| 6,643,652 B2 | 11/2003 | Helgeson et al. | |
| 6,708,161 B2 | 3/2004 | Tenorio et al. | |
| 6,754,666 B1 | 6/2004 | Brookler et al. | |
| 6,785,667 B2 | 8/2004 | Orbanes et al. | |
| 6,807,834 B2 | 10/2004 | Tsai | |
| 6,901,515 B1 * | 5/2005 | Muratani | 713/176 |
| 6,938,046 B2 | 8/2005 | Cooke et al. | |
| 2001/0047385 A1 | 11/2001 | Tuatine | |
| 2002/0008208 A1 | 1/2002 | Alattar et al. | |
| 2002/0169744 A1 | 11/2002 | Cooke et al. | |
| 2002/0191809 A1 | 12/2002 | Kirovski et al. | |
| 2004/0002982 A1 | 1/2004 | Ersek et al. | |
| 2004/0143742 A1 | 7/2004 | Muratani | |

FOREIGN PATENT DOCUMENTS

| | | |
|---|---|---|
| WO | WO 97/34391 | 9/1997 |

OTHER PUBLICATIONS

Boneh: "Collusion-secure fingerprinting for digital data"; Information Theory, IEEE Transaction on, vol. 44 Issue: 5, Sep. 1998; pp. 1897-1905.

George, et al.; "Digital watermarking of images and video using direct sequence spread spectrum techniques"; Electrical and Computer Engineering, 1999 IEEE Canadian Conference on, vol. 1, 1999 pp. 116-121 vol. 1.

Cox, et al.; "Secure spread spectrum watermarking for multimedia"; Image Processing, IEEE Transactions on, vol. 6 Issue: 12; Dec. 1997; pp. 1673-1687.

Vidal, et al.; "Optimum watermark detection and embedding in digital images"; Multimedia Signal Processing, 1998 IEEE Second Workshop on, 1998 pp. 285-290.

Hartung et al.; "Fast public-key watermarking of compressed video"; Proceedings International Conference on Image Processing; Oct. 26-29, 1997; pp. 528-531; vol. 1.

Wahl, M., "A Summary of the X.500(96) User Schema for use with LDAPv3" The Internet Society Dec. 1997 20 pages.

"Information Technology—Open Systems Interconnection—The Directory: The Models" Recommendation X.501 ISO/IEC 9594-2 Feb. 14, 1993 164 pages.

(www.w3.org) discloses a "XML Schema Part 2: Datatypes" W3C Recommendations May 2, 2001 pp. 1-21.

"Hierarchy Visualization" Publication retrieved from the internet in May 2004 http://www.cs.ubc.ca/tmm/courses/cpsc533c-04-spr/slides/0331.cchita2.6up.pdf.

"Lightweight Directory Access Protocol (v3): UTF-8 String Representation of Distinguished Names" The Internet Society 10 pages.

"Lightweight Directory Access Protocol (v3)" Internet Society Dec. 1997 50 pages.

"Lightweight Directory Access Protocol (v3): Attribute Syntax Definitions" The Internet Society Dec. 1997 32 pages.

"The Directory—Overview of Concepts Models and Services" 1988 47 pages.

"The String Representation of LDAP Search Filters" The Internet Society 8 pages.

"The LDAP URL Format" The Internet Society Dec. 1997 8 pages.

Baeza-Yates, et al., "New Approaches to Information Management: Attribute-Centric Data Systems", String Processing and Information Retrieval, 2000. Spire 2000. Proceedings. Seventh International Symposium on Sep. 27-29, 2000. Piscataway, NJ, USA, IEEE, Sep. 27, 2000, pp. 17-27.

Furnes, et al, "Multitrees: Enriching and Reusing Hierarchical Structure", 1994. Hum Factors Comput Syst; Conference Proceedings on Human Factors in Computing Systems; Celebrating Independence 1994. Published by ACM. New York, NY, USA, pp. 330-336.

Yamamoto, et al., "A Method of Image Watermarking which can Detect All Illegal Users in Collusion", retrieved on 1996 Symposium on Cryptography and Information Security, Hammanako, Japan, Jan. 28-31, 1998, English Language Translation, pp. 08.

* cited by examiner

| User | Block 0 | Block 1 | Block 2 | Block 3 |
|---|---|---|---|---|
| 1 | 1111 | 1111 | 1111 | 1111 |
| 2 | 0000 | 1111 | 1111 | 1111 |
| 3 | 0000 | 0000 | 1111 | 1111 |
| 4 | 0000 | 0000 | 0000 | 1111 |
| 5 | 0000 | 0000 | 0000 | 0000 |

*Fig. 2*
*(Prior Art)*

| User | Block 0 | Block 1 | Block 2 | Block 3 |
|---|---|---|---|---|
| 1 | $C_0$ | $C_1$ | $C_2$ | $C_3$ |
| 2 | $C'_0$ | $C_1$ | $C_2$ | $C_3$ |
| 3 | $C'_0$ | $C'_1$ | $C_2$ | $C_3$ |
| 4 | $C'_0$ | $C'_1$ | $C'_2$ | $C_3$ |
| 5 | $C'_0$ | $C'_1$ | $C'_2$ | $C'_3$ |

METHODS AND SYSTEMS FOR FINGERPRINTING DIGITAL DATA

RELATED APPLICATIONS

This application is a continuation of and claims priority to U.S. patent application Ser. No. 09/437,713, filed on Oct. 28, 1999 now U.S. Pat. No. 6,754,364, the disclosure of which is incorporated by reference herein.

TECHNICAL FIELD

This invention pertains to methods and systems for fingerprinting digital data.

BACKGROUND

Fingerprinting is a technique that involves uniquely marking each copy of a particular object, and associating each uniquely marked copy with a particular entity to which the copy is distributed. If unauthorized copies of the uniquely marked copy are made, the fingerprint can be traced back to the original entity to which the copy was initially distributed.

As an example, consider a printed map. When a map maker produces a map, they may want to ensure that those individuals to whom the map is distributed do not make unauthorized copies of the map and distribute them to others. One way that the map maker might protect his maps is to introduce a different trivial error, or fingerprint, (e.g. a non-existent street) into each of the copies of the map that are distributed. Each fingerprint is then associated with an individual to whom the map is to be distributed. By associating each different fingerprint with a different individual, if and when unauthorized copies of that individual's copy are uncovered, they can be traced back to the original individual by virtue of the unique fingerprint that the map contains.

One problem with this type of fingerprinting can arise when two or more individuals collude for the purpose of discovering their fingerprints. That is, when two or more individuals get together and compare their maps, they can, given enough time, ascertain their unique fingerprints by simply looking for the differences between their maps. If they can ascertain their fingerprint, they can alter it and therefore possibly avoid detection.

In contemporary times, particularly with the advent of the Internet and electronic distribution, fingerprinting digital data (e.g. software, documents, music, and video) for purposes of detecting or deterring unauthorized copying has become particularly important. As in the above map example, collusion by different individuals in the digital context can pose challenges to the owners and distributors of such digital data. Although progress has been made in the area of digital fingerprinting, further strides are necessary to increase the breadth of protection that is afforded by digital fingerprinting. For example, in one fingerprinting system (the "Boneh-Shaw system" discussed in more detail below), some protection against collusion is provided, but only when the number of colluders is relatively small. Thus, there is a need to increase the protection that is provided by digital fingerprinting to provide detection of colluders even when the number of colluders is large.

Accordingly, this invention arose out of concerns associated with providing improved methods and systems for fingerprinting digital data.

SUMMARY

Methods and systems for fingerprinting digital data are described. In the described embodiment, Direct Sequence Spread Spectrum (DSSS) technology is utilized. Unique fingerprinting words are defined where each includes at least one spread sequence. In the described embodiment, a fingerprinting word comprises a plurality symbols, called "$\Gamma$ symbols." Each $\Gamma$ symbol is composed of $2c-1$ blocks, where c represents the number of colluders that are desired to be protected against. Each block contains d spread sequence chips. The fingerprinting words are assigned to a plurality of entities to which protected objects embedded with the fingerprinting words are to be distributed.

To ascertain the identity of an entity that has altered its unique fingerprinting word, the relative weight of each block is computed in accordance with a defined function and blocks whose weights satisfy a predetermined relationship are "clipped" to a so-called working range. Each $\Gamma$-symbol of the altered fingerprinting word is then processed to produce a set of one or more "colors" that might be the subject of a collusion. Each $\Gamma$-symbol in the fingerprinting word for each entity is then evaluated against a corresponding produced set and the entity having the most overall incriminating "colors" is incriminated.

BRIEF DESCRIPTION OF THE DRAWINGS

FIG. 2 is a table that contains a plurality of values that are assignable to various users in connection with the Boneh-Shaw system.

FIG. 3 is a table that contains a plurality of values that are assignable to various users in connection with the described embodiment.

DETAILED DESCRIPTION

Overview

In the described embodiment, digital data or objects are fingerprinted, i.e. embedded, with unique fingerprinting words. Each fingerprinting word is associated with one of a number of entities or users to which the fingerprinted objects are to be distributed. In the described scheme, each fingerprinting word contains a plurality of $\Gamma$-symbols, and each $\Gamma$-symbol contains a plurality of blocks. Each block, in turn, comprises a spread sequence that has a plurality of spread sequence chips.

When an altered object is received, it is first processed to identify the embedded spread sequence chips. Once the chips are identified, a relative weight function is defined and used to calculate the relative weight for each block. The relative weight calculations for each block are analyzed in accordance with a predetermined relationship which determines which of the blocks gets "clipped" to a predefined working range. The clipped blocks are those that are likely to be "unseen" in the sense that the colluders who colluded to produce the altered object likely were not able to see these blocks, i.e. they were the same. The blocks that are not clipped constitute those blocks that likely were "seen" and therefore possibly altered by the colluders.

With the relative weights of each block having been computed, and the working range defined, each Γ-symbol of the altered object is processed to produce a set of possible Γ-symbols that might be the subject of a collusion. The collection of sets defines a matrix. Each Γ symbol for a user's unique fingerprint is then compared with the set for each corresponding Γ-symbol in the matrix and a count is kept of the number of times each user's Γ symbol coincides with a Γ-symbol that is found in a particular set. When all of the users have been thus evaluated, the user with the highest count is selected as a colluder that produced the altered object.

Exemplary Computer System

Figure 1:
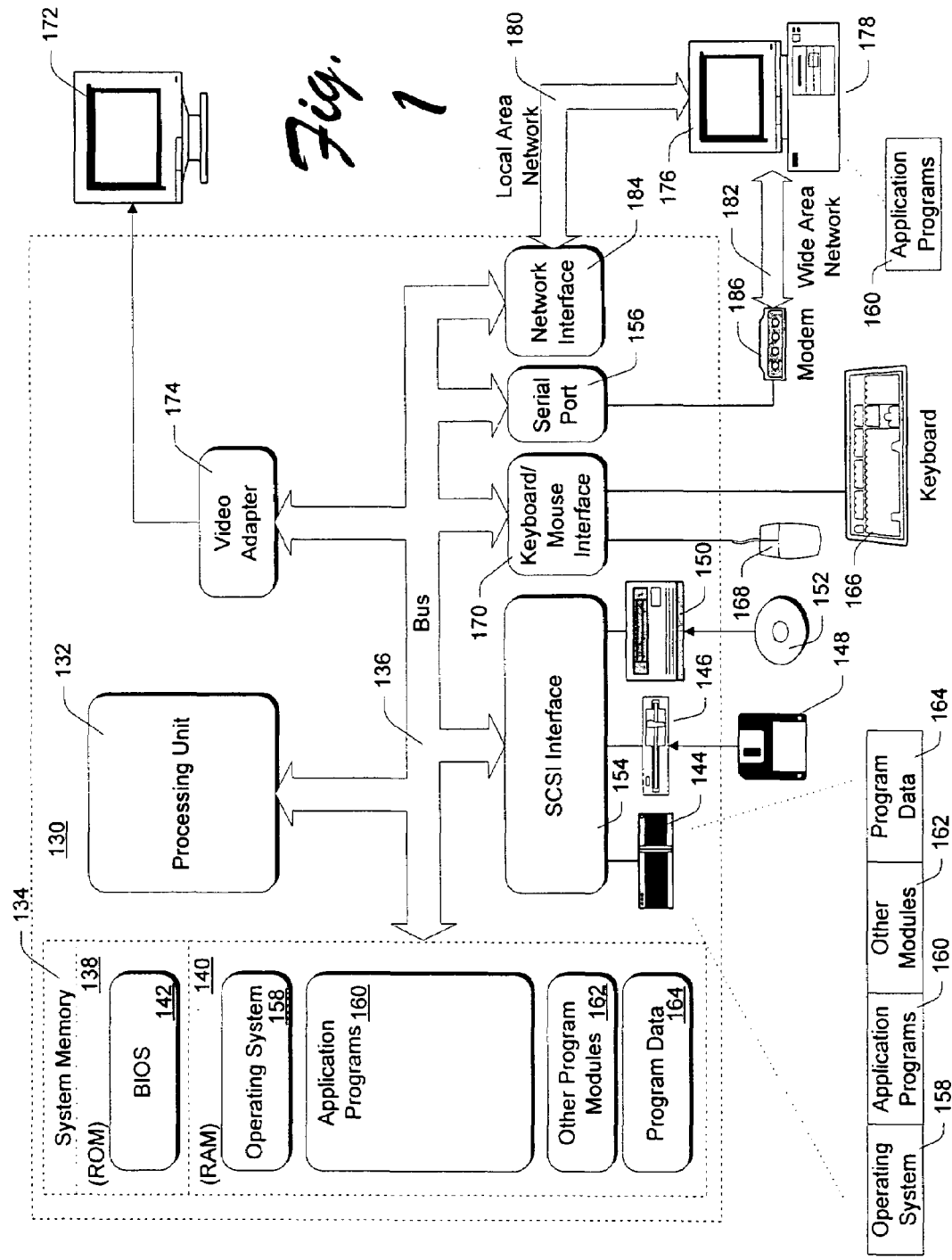
FIG. 1 is a diagram of a computer system that can be utilized in connection with various aspects of the invention.

FIG. 1 shows a general example of a computer 130 that can be used in accordance with the invention. Various numbers of computers such as that shown can be used in the context of a distributed computing environment.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

The Boneh-Shaw System

The Boneh-Shaw system (hereinafter "the BS-system") is a fingerprinting system for use with digital data. The BS-system attempts to overcome the problem of collusion when fingerprinting digital data. Aspects of the B-S system are described in an article entitled "Collusion-Secure Fingerprinting for Digital Data" authored by Boneh and Shaw, appearing in IEEE Transactions on Information Theory, Vol. 44, No. 5, September 1998.

One of the principle assumptions in the B-S system is known as the "marking assumption": that users cannot alter marks if they cannot determine which data comprise the marks. When an object is fingerprinted, it is embedded with a fingerprinting word that is unique for each entity or user. By colluding, users can detect a specific mark if it differs between their copies; otherwise, a mark cannot be detected.

This is the basis of the marking assumption—that is, users cannot change marks that they cannot see. These marks are referred to as "unseen" marks.

In the B-S system, each user is assigned a unique fingerprinting word. An example of fingerprinting word assignments is shown in FIG. 2 for five users. Each row corresponds to a user and shows blocks that form the fingerprinting word for that user. For example, user 1 has a fingerprinting word "1111111111111111", user 2 has a fingerprinting word "0000111111111111", and so on for each of the users. The collection of the fingerprinting words for all of the users defines a step structure that is illustrated by the bold line through the table. This stepped structure is instrumental in ascertaining potential colluders as will become apparent below.

Each fingerprinting word is divided into a number of blocks that, in turn, include a plurality of bits. In this example, there are four blocks that are designated as block 0, block 1, block 2, and block 3. Each of the blocks includes, in this example, four bits. For purposes of this discussion, the matrix that is defined by the fingerprinting word assignments is known as a "Γ-code". As there can be many, many users, the Γ-code necessary to provide fingerprinting words for all of the users will be quite large.

In accordance with the B-S system, a single permutation of the columns of the Γ-code is performed before embedding an object with a fingerprint word. An exemplary permutation is shown in Table 1 below where the order of the blocks is changed. For simplicity, the permutation as represented in the table above occurs over whole blocks. In reality, the permutation occurs at the bit level. For example, the column of leftmost bits might be moved to bit position 12. This permutation is uniform for all of the users and is known only to the encoder or embedder and the decoder:

TABLE 1

| User | Block 2 | Block 1 | Block 3 | Block 0 |
|---|---|---|---|---|
| 1 | 1111 | 1111 | 1111 | 1111 |
| 2 | 1111 | 1111 | 1111 | 0000 |
| 3 | 1111 | 0000 | 1111 | 0000 |
| 4 | 0000 | 0000 | 1111 | 0000 |
| 5 | 0000 | 0000 | 0000 | 0000 |

When an object is fingerprinted, it is embedded with a permuted fingerprinting word that corresponds to one of the users. For purposes of discussion, an "object" is any digital data that is suitable for fingerprinting. Examples of such objects include, without limitation, documents, music, and video. When an illegal copy of a protected object is made, a user will typically attempt to alter their fingerprinting word so as to avoid detection. The BS-system is directed to ascertaining, with a desirable degree of certainty, the identity of one or more users that may have collaborated in the altering of a protected object. This is done by examining the altered object.

In the discussion that follows, the altered object is represented as x where x is a binary word of length u, and $I=\{i_1 \ldots i_r\}$ is a subset of bit locations of x, i.e. $I \subseteq \{1 \ldots n\}$. The notation $x \downarrow I$ denotes the restriction of word x to the bit locations of I. Let $W(x)$ denote the Hamming weight of the string x. The Hamming weight of a binary string of 1's and 0's is the number of 1's in the string. Likewise, if the string is composed of +1's and −1's, we could define it to be the number of +1's in the string.

The First Algorithm

The BS-system employs a first algorithm that is directed to finding a subset of a coalition that produced an altered object x. Thus, at this point, an altered object has been produced by two or more users and an attempt is going to be made to identify a subset of users that likely produced the object x. Before describing the algorithm that produces a subset of likely user candidates, consider the following. When an altered object x is received, it will inevitably contain some form of a fingerprinting word. Recall that each user is assigned a unique permuted fingerprinting word, an example of which is given in Table 1 above. Because each user is assigned a unique fingerprinting word, certain aspects of the fingerprinting word will be unique to each user. For example, a unique aspect of user 1's fingerprinting word in FIG. 2 is that block 0 comprises all 1's. Each of the other users has all 0's in their corresponding block 0. Thus, if users other than user 1 are colluders, then, in accordance with the marking assumption (which states that users cannot modify "unseen" bits), none of the bits in block 0 will be modified. Accordingly, all of the bits in block 0 will be 0 and user 1 can be ruled out as a colluder. On the other hand, if any of the bits in block 0 of the altered object x are determined to be 1, then user 1 can be incriminated as a colluder. Again, this is because the bits of block 0 are only capable of being "seen" by a collusion that includes user 1 because they are different from the bits in block 0 for all of the other users. Thus, the first algorithm simply looks at the fingerprinting word in the altered object and attempts to identify, with a desired degree of certainty, which users are possible candidates for incrimination given that certain bits or blocks have been modified. It does this by considering the Hamming weight of particular blocks that are or can be uniquely seen by particular users.

As a more concrete example, consider that users 3 and 4 are going to collude to change a fingerprinting word on their protected objects. Users 3 and 4 will thus compare their permuted fingerprinting words. From Table 1 above, this comparison will be as follows:

| User | Block 2 | Block 1 | Block 3 | Block 0 |
|---|---|---|---|---|
| 3 | 1111 | 0000 | 1111 | 0000 |
| 4 | 0000 | 0000 | 1111 | 0000 |

When users 3 and 4 compare their fingerprinting words, the bits that appear in blocks 1, 3, and 0 are "unseen" to the users. This is because they contain the same values. Thus, in accordance with the marking assumption, the users cannot change the values of any of the bits at these locations. The bits that appear in block 2, however, are different as between the users, i.e. they are "seen". Accordingly, users 2 and 3 will recognize that because of this difference, there must be a fingerprint in block 2. Knowing this, they can then modify the fingerprint of block 2 so as to avoid detection. In this example, the resulting fingerprinting words might look like this:

| User | Block 2 | Block 1 | Block 3 | Block 0 |
|---|---|---|---|---|
| 3 | 0011 | 0000 | 1111 | 0000 |
| 4 | 0011 | 0000 | 1111 | 0000 |

Here, they changed the first two bits in block 2 from "1" to "0". Note that they would not change all of the bits of block 2 because then the resultant fingerprinting word would be that of user 4 and would result in user 4's incrimination as a colluder. When the blocks are unpermuted, the resulting Γ-code looks like this:

| User | Block 0 | Block 1 | Block 2 | Block 3 |
|------|---------|---------|---------|---------|
| 1    | 1111    | 1111    | 1111    | 1111    |
| 2    | 0000    | 1111    | 1111    | 1111    |
| 3    | 0000    | 0000    | 0011    | 1111    |
| 4    | 0000    | 0000    | 0011    | 1111    |
| 5    | 0000    | 0000    | 0000    | 0000    |

One thing that the reader will notice is that there is still some semblance of a step function that is defined for user 3 by blocks 1 and 2. This step function, as was pointed out above, is unique for user 3 at the location of blocks 1 and 2. That is, all of the other users, either above or below user 3 have, respectively, all 1's or all 0's in their blocks 1 and 2.

What the first algorithm does is that, after the columns are unpermuted, it looks for this unique step function or some semblance thereof for users other than the first and last users. For the first and last users, the algorithm simply looks for the unique bits in the blocks that are unique for the first and last users. When a step function (or unique bits) are located, a corresponding user can be incriminated. In this example, since the step function still exists for user 3, user 3 can be incriminated. This can be mathematically represented as follows ($\epsilon$ is the incrimination error probability):

Algorithm 1
1. If $W(x \downarrow \text{Block } 1) > 0$, then user 1 is incriminated.
2. If $W(x \downarrow \text{Block } (n-1)) < d$, then user n is incriminated.
3. For all s=2 to n-1 do:
   Let $R_s = (B_{s-1} \cup B_s)$ (i.e. the bit locations of those two adjacent blocks.)
   Let $K = W(x \downarrow R_s)$.
   If $W(x \downarrow \text{Block } (s-1)) < K/2 - ((K/2)\log(2n/\epsilon))^{1/2}$, then user "s" is incriminated.

The Second Algorithm

As was pointed out above, the number of potential users of a given protected object can be quite large. Thus, using the Γ-code approach discussed above will, accordingly, result in fingerprinting words that are very large in size. The second algorithm of the BS-system is directed to incriminating a user or colluder without having to use such a large Γ-code. When using this algorithm, let c represent the number of colluders that are desired to be defended against. A Γ-code is then selected to have 2c rows. In this system each row is also referred to as a "color". So, for example, if one wants to defend against 20 colluders, then a Γ-code is selected that has 40 rows or colors. Each row or color in the Γ-code comprises a plurality of blocks that make up a Γ-symbol. Each color or Γ-symbol is treated as a letter in an alphabet that is defined by the Γ-code. The letters in the alphabet are then used to build unique fingerprinting words for each of the users of the protected object. That is, fingerprinting words contain L colors or Γ-symbols, where L is a number that is selected to be large enough so that, given the number of users that are to be assigned fingerprinting words, each is assured of being assigned a unique fingerprinting word.

As an example, consider the following. Assume that it is desirable to defend against 3 colluders at any given time. Thus, a Γ-code is defined to have 2(3)=6 colors or Γ-symbols. This is illustrated in the Table 2 below:

TABLE 2

| Color | Γ symbol |
|-------|----------|
| 1     | $\Gamma_1$ |
| 2     | $\Gamma_2$ |
| 3     | $\Gamma_3$ |
| 4     | $\Gamma_4$ |
| 5     | $\Gamma_5$ |
| 6     | $\Gamma_6$ |

Consider further, in this example, that in the universe of users, the number of Γ symbols that are necessary for each user to be assigned a unique fingerprinting word is 3, that is L=3. So, user 1 might be assigned a fingerprinting word ($\Gamma_4$ $\Gamma_5$ $\Gamma_3$), user 2 might be assigned a unique fingerprinting word ($\Gamma_3$ $\Gamma_5$ $\Gamma_2$), and so on for all of the users. Each of the protected objects are embedded with a permuted form of one of the fingerprinting words. Now, when an altered object is found, applying the principles of Algorithm 1 to each of the Γ symbols in the altered object will yield a set of colors or Γ-symbols that are likely the subject of a collusion. So, in this example, there are three Γ symbols that comprise the altered fingerprinting word. Algorithm 1 is applied to each of the three Γ symbols. The result of this computation yields a set of colors or Γ-symbols for each Γ symbol of the altered fingerprinting word. So, for the first Γ symbol of the altered fingerprinting word, the set of colors (1, 2, 3), i.e. $\Gamma_1 \Gamma_2 \Gamma_3$, might be produced. For the second Γ symbol of the altered fingerprinting word, the set of colors (2, 4), i.e. $\Gamma_2 \Gamma_4$, might be produced. For the third Γ symbol of the altered fingerprinting word, the set of colors (3, 6), i.e. $\Gamma_3 \Gamma_6$, might be produced. These results are summarized in the table below:

| Γ symbol       | Color Set |
|----------------|-----------|
| First Γ symbol | 1, 2, 3   |
| Second Γ symbol| 2, 4      |
| Third Γ symbol | 3, 6      |

From the collection of possible color sets, the BS-system builds a word or vector by selecting, at random, one and only one color from each color set. In this example, a word might be built by selecting color 1 from the color set associated with the first Γ symbol, color 4 from the color set associated with the second Γ symbol, and color 6 from the color set associated with the third Γ symbol. Thus, the word that is built is as follows: $\Gamma_1$ $\Gamma_4$ $\Gamma_6$. Now, the user having a fingerprinting word that is closest to this word is incriminated. More detailed information on the BS-system and its proofs can be found in the article referenced above. Algorithm 2 is summarized just below.

Algorithm 2
1. Apply Algorithm 1 to each of the L Γ-symbols. For each of the L components arbitrarily choose one of the outputs of Algorithm 1. Set $y_i$ to be that chosen output ($y_i$ is an integer in [1,n]). Form the word $y=(y_1 \ldots y_L)$.
2. Find the fingerprinting word that is closest to y, and incriminate the corresponding user or entity.

In the BS-system, the length in bits of the fingerprinting word or sequence is given by the following equation: $O(c^4 \log(N/\epsilon) \log(1/\epsilon))$, where "c" is the size of the collusion, "N" is the number of users, and $\epsilon$ is the incrimination error probability. Suppose that it is desirable to protect a 2-hour long object in a system that is able to robustly hide 1 bit/sec. The number of colluders that can be protected against, assuming the N=$10^6$, and $\epsilon$=$10^{-3}$ is just c=4. Protecting against just four colluders, while a step in the right direction, does not go far enough for defending against the possibility that larger numbers of users might get together and collude.

Inventive Methods and System Overview

In accordance with the inventive methods and systems, aspects of the BS-system are exploited in conjunction with the use of spread spectrum technology. A spread spectrum sequence is associated with individual blocks of individual fingerprint words. The spread spectrum sequence utilizes a data structure called a "chip" that is embedded in the protected object. The use of spread sequences in the embedding process enables redefinition of the relative weight of each block as well as redefinition of a working range (defined below). The new weights and working range are utilized in connection with an analysis that increases the robustness of the protectiveness over that of conventional methods and systems provide.

Spread Spectrum

Before discussing the details of the inventive methods and systems, some basic background information on spread spectrum technology is given. For additional background on spread spectrum technology, the reader is referred to a text entitled "Spread Spectrum Communications Handbook" Revised Edition (1994), authored by Simon, Omura, Scholtz, and Levitt.

An object that is desired to be protected can be represented as a vector m=($m_1, \ldots m_u$). This vector can represent pixels in a movie or any type of suitable digital content that is desirable to protect. The components of this vector are viewed over some large alphabet size, e.g. $m_1$ could be an 8-bit byte that can have a value from between −128 to +128. Spread spectrum chips x=($x_1, \ldots x_u$) are utilized that have values that are measured in the same units as the individual components of the protected object vector, but which have values that are small in comparison to the values that the individual vector components can have, e.g. the chips have values that are in {+1, −1}. That is, values of x are selected to be small enough that when they are added to m they are difficult if not impossible to detect.

A spread sequence can be utilized to embed data symbols that are in {+1, −1}. These embedded data symbols are different from the individual values {+1, −1} that a spread spectrum chip can have, and therefore the notation {+D, −D} is utilized to represent the data symbols {+1, −1} so as to avoid confusion. When a data symbol +D or −D is to be embedded, the vector m for the object is combined with the appropriate spread spectrum chips. To embed a +D we add the spread sequence as is, while to embed −D we flip the chips (i.e. take the 1s complement of the sequence) of the spread sequence before adding it. So, to embed +D we compute a new vector b as follows: $(\forall j)[b_j=m_j+x_j]$, and to embed −D we compute $(\forall j)[b_j=m_j-x_j]$. When such an embedded object is to be detected, the vector b can be multiplied by the vector x and summed over all of the vector components. The summing of the resultant vector components will indicate whether a data symbol +D or −D was embedded, as will be understood by those skilled in the art.

Embedding

In the discussion that follows, four specific types of data structures are defined and used in the embedding/detection process, i.e. chips, blocks, Γ-symbols and fingerprinting words. While the latter three data structures share the same names as those discussed above in connection with the BS-system, their definitions render them completely different and represent a significant departure from the BS-system, as will become apparent below.

A "chip" is the smallest of the data structures and refers to a spread spectrum chip. Spread spectrum chips are designated as x=($x_1, \ldots x_u$) and have values in {+1, −1}. As in the above discussion on spread spectrum technology, the data symbols that are embedded through the use of the spread spectrum chips are in {+D, −D}. A "block" is composed of d chips, where d represents a parameter that controls the error rate. The blocks are designated as $C_1 \ldots C_k$, where an individual block i is defined as $C_i$=($c_{i1} \ldots c_{id}$), with $c_{i1} \ldots c_{id}$ constituting the individual spread spectrum chips. The 1s complement of block $C_i$ is denoted $C'_i$. A "Γ-symbol" comprises a plurality of blocks. In the described embodiment, a Γ-symbol is composed of 2c-1 blocks, where c represents the number of colluders that are desired to be defended against. Last of the data structures is the fingerprinting word which is composed of L Γ-symbols, where L represents a particular number that is selected to ensure that all of the users in the relevant user universe receive unique fingerprinting words.

Each user is first assigned a unique fingerprinting word. In the described embodiment, the fingerprinting words incorporate a spread sequence rather than the individual bits as in the BS-system. Specifically, in the described embodiment, each block $B_i$ of the Γ code in the BS-system is replaced with a suitable spread sequence. In this example, blocks that are supposed to be a $1^d$ in the BS-system are replaced with $C_i$, and blocks that are supposed to be $0^d$ are replaced with the 1s complement $C'_i$. An exemplary Γ code in accordance with this embodiment is shown in FIG. 3. Once the users have been assigned their fingerprint words, the columns of the Γ code are permuted (at the chip level) as discussed above. An object can now be fingerprinted with the fingerprinting words that are defined by the permuted Γ code.

Figure 4:
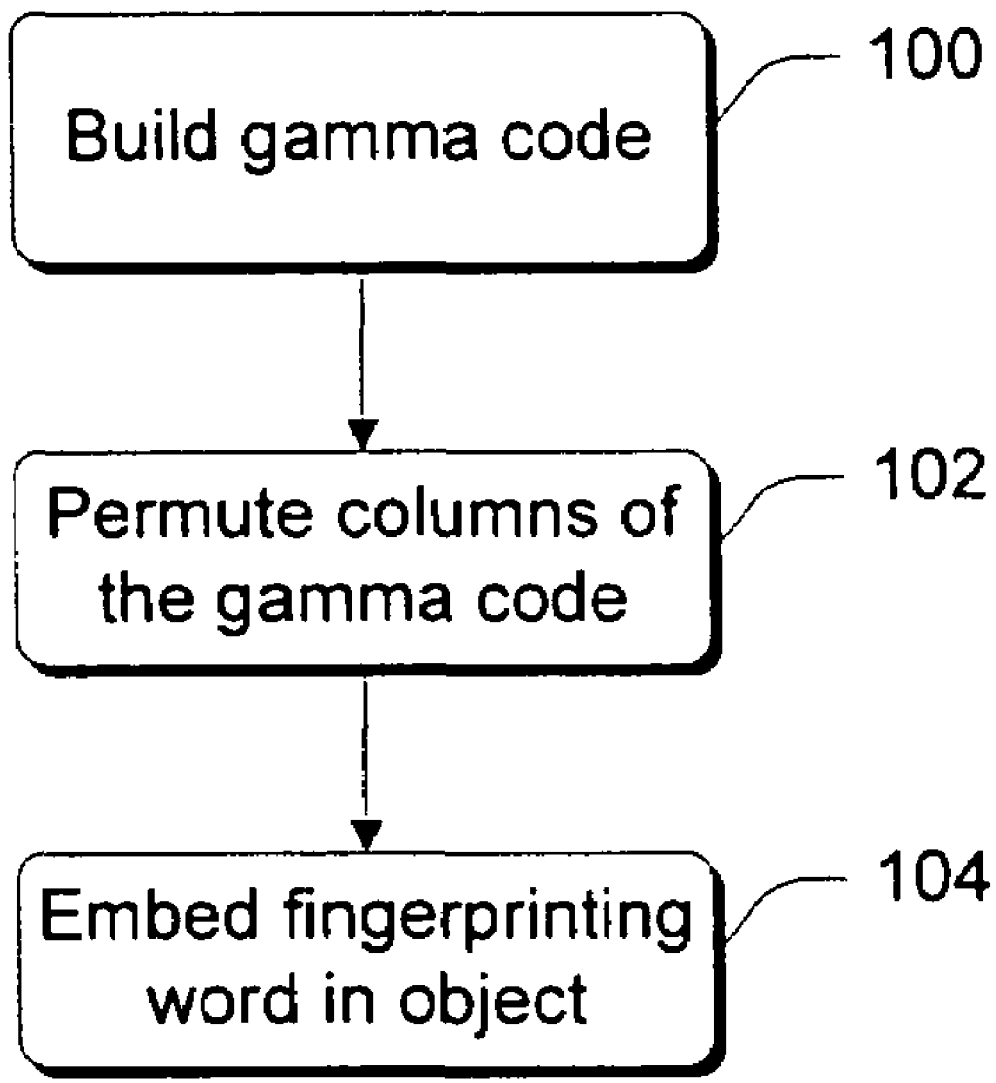
FIG. 4 is a flow diagram that describes steps in an embedding method in accordance with the described embodiment.

FIG. 4 shows a flow diagram that describes steps in an embedding method in accordance with the described embodiment. Step 100 builds or defines a suitable Γ-code, an exemplary one of which is shown in FIG. 3. Step 102 permutes the columns of the Γ-code in a manner that is known only to the embedder and the decoder that will ultimately decode the fingerprints. Permutation of the columns can take place by randomly shuffling the chips for all of the users (the same permutation for all the users). The permutation is the same for all of the users. An example of a suitable permutation was given above. Once the columns have been permuted, step 104 embeds a unique fingerprinting word in each of a number of different objects that are desired to be protected. An example of an embedding process is given just below. After the embedding process, the protected objects can be distributed.

Assume that a vector m=($m_1, \ldots m_u$) is defined that represents an object or signal that is to be protected. A spread sequence x=($x_1, \ldots x_u$) is to be used as an embedded spread sequence. Here, $(\forall j)[x_j \in \{+1, -1\}]$, and the signal is over a large alphabet whose size is not important for this discussion. When the object is embedded with a data symbol +D (or −D), the resultant marked signal is designated as b={$b_1 \ldots b_k$}, where $(\forall j)[b_j=m_j+(-)x_j]$.

Assume also that an adversary attempts to jam the protected object signal by adding a noise element $J_i$ to each component, where $J_i$ is at the same energy level as the spread sequence, i.e. $J_i \in \{+1, -1\}$, but it is uncorrelated with the spread sequence. After the jamming attack the signal can be represented as a=($a_1 \ldots a_u$), where $(\forall j)[a_j=m_j+-x_j+J_i]$.

Accordingly, the vector a represents the protected object as seen by the detector, (i.e. after embedding and after jamming attacks).

Chip Detection

A first step in the detection process when an object is received is to unpermute the columns that were previously permuted. Recall that after the fingerprinting words are assigned but before an object is embedded, the columns (at the chip level) of the Γ-code are randomly permuted. Both the embedder and the detector know the random permutation. After the columns are unpermuted, the chips are detected in the received object. In this example, the received object is represented as $a=(a_1 \ldots a_u)$ and the chips are detected by comparing the received object with an original expected object $m=(m_1, \ldots m_u)$. Each component, e.g. pixel, $a_i$ is compared with the expected unfingerprinted component, e.g. pixel, $m_i$. The following table lists the comparisons and their outcomes: We use $z'_i$ to denote the detected chip i. This may differ from the original chip $x_i$, due to attacks.

| Comparison | Outcome |
| --- | --- |
| $a_i > m_i$ | Chip $z'_i = +1$ |
| $a_i < m_i$ | Chip $z'_i = -1$ |
| $a_i = m_I$ | Chip $z'_i = 0$ |

With the individual chips having been identified, attention is now turned to detecting a user that likely constitutes a colluder.

Clipping

In the described embodiment, each block in a fingerprinting word comprises d chips. These chips were previously detected as described above. With the chips having been detected, the blocks that comprise the fingerprinting word are initially "clipped" in an effort to distinguish between so-called "seen" and "unseen" blocks. Recall that "seen" blocks are those blocks that can be ascertained by two or more users or entities because of their differences. Alternately, "unseen" blocks are those blocks that cannot be "seen" by users because they are identical. Hence, clipping the blocks as described below distinguishes the "seen" and "unseen" blocks.

In the discussion that follows, the analysis deals with blocks, Γ-symbols, and Error correcting codes over an alphabet whose symbols are the Γ-symbols. In a first step, a function is defined from which a relative weight can be calculated. The function is defined as follows:

Let $x \in \{1, -1\}$ and $y \in \{0, 1, -1\}$. Define the function:
    f(y, x)=1 if x is not equal to y, and y is not equal to 0,
        0 Otherwise.
Let $X=(x_1, \ldots, x_d)$, where $x_i \in \{1, -1\}$ and $Y=(y_1, \ldots, y_d)$, where $y_i \in \{1, -1, 0\}$. The weight of Y relative to X is w(Y, X)—which is the sum from i=1 to d of $f(y_i, x_i)$. When the reference point, X, is known from the context, we omit it and write w(Y).

It follows that when an original block i has a value $C_i'$ ("light blocks"), then its weight relative to $C_i'$ is zero. This holds true even after jamming. On the other hand, if the original block was $C_i$ ("heavy block"), then its weight relative to $C_i'$ after maximal jamming has a mean d/2, with deviation $O((d)^{1/2})$. This means that the working range is roughly d/2.

With the above function having been defined, weight assignment and clipping steps can now take place. In the described embodiment, this takes place by receiving, as input, the detected chips $z_i$ arranged as blocks of d chips each $(B_1, B_2, \ldots)$. The output of the weight assignment and clipping steps is the relative weight of each block, with blocks that are likely "unseen" being clipped to their working range value. This can be represented mathematically as follows:

---

Input: Detected chips $z = (z_1, z_2, \ldots)$, arranged as blocks of d chips each $(B_1, B_2, \ldots)$
  Output: For each block $B_i$ output its relative weight, $w_i = w(B_i, C_i')$, clipping blocks that are likely unseen to their working range value.
  Method: Define $\mu = d/2$, and let δ be a parameter that is defined just below.
  For each block $B_i$ {
    If $w(B_i) > (1 - δ) \mu$, then set $w_i = (1 - δ) \mu$;
    Else, set $w_i = w(B_i, C_i')$;
  }
  }

---

Parameter Choice:

For N users, assuming we want to defend against a collusion of size c, with error probability ε, then we choose:
  Number of Γ-symbols per a fingerprint word=L=2cln(2N/ε),
  Block size=d=$8c^2$ ln(8cL/ε),
  f=2 ln($4c^2$ln(2N/ε)ε),
  δ=f/√(d/2),
  μ=d/2.

Figure 5:
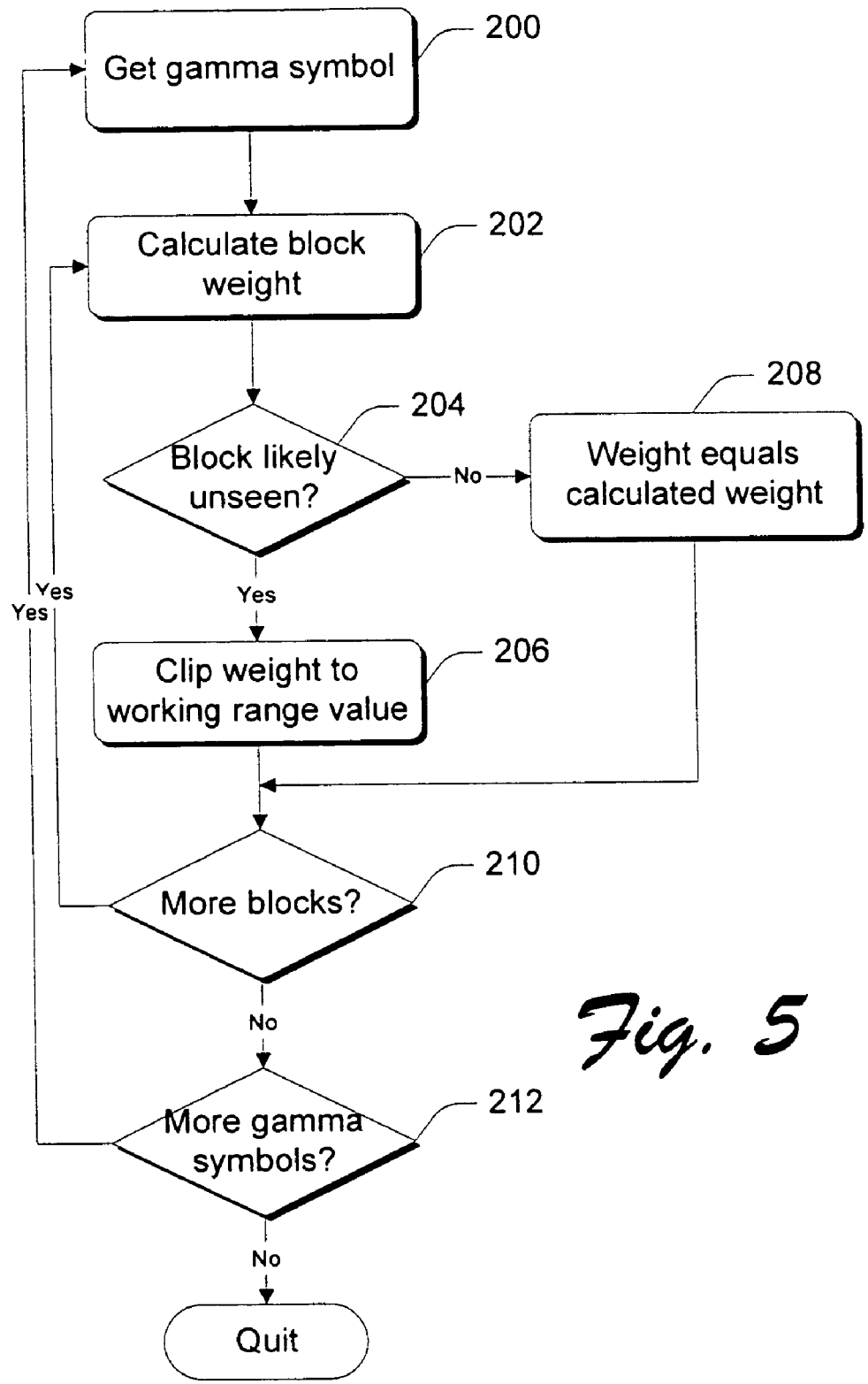
FIG. 5 is a flow diagram that describes steps in a detection method in accordance with the described embodiment.

FIG. 5 shows a flow diagram that describes steps in a weight assignment and clipping method in accordance with the described embodiment, an example of which is given directly above. Step 200 gets the first block that is present in a fingerprinting word. Step 202 calculates the weight of the first block. In the described embodiment, the weight of a given block is calculated as set forth above. Step 204 determines whether the block is likely an "unseen" block and if so, step 206 clips the block's weight to its working range value. If the block is likely "seen", then its weight is as calculated above (step 208). Step 210 determines whether there are any additional blocks. If so, the method branches back to step 202. Step 212 determines whether there are any additional gamma symbols. If there are, the method returns to step 200. If there are not, the method quits.

Detection of a Subset that Produced an Altered Object x

With the weights having been calculated for the various blocks of the altered fingerprinting word, and with the working range having been defined as set forth above, attention is now turned to ascertaining a subset of the coalition that produced an altered object x. The method that is utilized to ascertain such a coalition is similar, in some respects, to the method of the BS-system discussed above. Primary differences lie in the use of the newly-defined weights for the blocks, as well as the use of the new working range.

Algorithm 3

Given $x \in \{0, 1\}^{dk}$, k=2c−1, find a subset of the coalition that produced x (within a Γ-code blocks are numbered $0, \ldots, k-1$, and "colors" are numbered $0, \ldots k$).

1. If $w_0 > 0$ output "color 0 is guilty."
  2. If $w_{k-1} < d/2 - (fd)^{1/2}$ output "color k is guilty."
  3. For all s=2 to k−2 do:
     a. Let K=w(x/$R_s$) (here the reference point for weight computation is ($C'_{s-1}, C'_s$)).
     b. If $w_{s-1} < K/2 - ((K/2)\ln(2n/ε))^{1/2}$, then output "color s is guilty."

The approach discussed above is particularly useful in the context of using a Γ-code having a reduced size. Recall that in the BS-system, a Γ-code having a reduced size was defined when the size of the Γ-code was considered in light of the number of colluders that were to be defended against. In that example, each new row or color of the Γ-code defined a Γ-symbol, and multiple Γ-symbols were used to build fingerprinting words for all of the users. Each of the fingerprinting words were different and unique. The permuted forms of the fingerprinting words are used for embedding in an object to be protected. Each of the fingerprinting words, when unpermuted and analyzed in accordance with the BS-system's second algorithm yielded a user that likely constituted a colluder.

In the presently-described embodiment, a reduced-size Γ-code is also defined and includes a plurality of colors or rows. The number of colors or rows is a function of the number of colluders c that are desired to be defended against. That is, the number of colors or rows is defined, in this example, to be 2c. Each color or row defines a Γ-symbol. The Γ-symbols that are being defined here are, however, very different from the Γ-symbols that are defined in the BS-system. Specifically, the presently-described Γ-symbols that make up the Γ-code each contain spread sequences, rather than collections of bits. In the specifically-discussed example, a fingerprinting word is composed of L Γ-symbols, where a Γ-symbol is composed of 2c-1 blocks. A block, in turn, is composed of d chips, where a chip is a spread spectrum chip. Given this relationship, the size of a vector that represents the protected object is 2dcL.

An exemplary, reduced-size Γ-code is shown in the table immediately below:

| Color | Γ symbol |
|---|---|
| 1 | $\Gamma_1$ |
| 2 | $\Gamma_2$ |
| 3 | $\Gamma_3$ |
| 4 | $\Gamma_4$ |
| 5 | $\Gamma_5$ |
| 6 | $\Gamma_6$ |

Here, there are six colors that define the Γ-code. These individual colors are used as the alphabet to build fingerprinting words for all of the users in the particular user universe. After the Γ-code is defined, each user or entity is assigned a fingerprinting word having L of these Γ-symbols, where L is a number that is selected so that no two users or entities have the same fingerprinting word. It also controls the error probability. With N users, and error probability $\epsilon$ we need $L=2c*\log(2N/\epsilon)$. This fingerprinting word serves to identify a user or entity later when an altered object is received. After the fingerprinting words are assigned, the columns are randomly permuted in a manner that is known to both the embedder and the detector. After permutation of the columns, individual objects that are desired to be protected are embedded with a permuted fingerprinting word that uniquely serves to identify an associated user or entity.

Recall that the way that protected objects typically get altered is that different entities or users get together and compare their protected objects. The concept of "seen" and "unseen" blocks was discussed above and refers, respectively, to blocks that have differences that can be ascertained by different colluders, and blocks that do not have differences and that cannot be seen by colluders. In accordance with the marking assumption discussed above, it is assumed, logically, that colluders will manipulate or adjust only the blocks that they can see. Accordingly, "unseen" blocks will not be manipulated or adjusted by colluders. Thus, when an altered object is received, it has a fingerprinting word that has been manipulated by two or more colluders. It may also be the case that random jamming may occur on the unseen bits.

Detection of an Entity that Likely Constitutes a Colluder

The manipulated or altered fingerprinting word contains L Γ-symbols. In the described embodiment, each of the individual constituent Γ-symbols in the altered fingerprinting word is analyzed and a set of one or more likely colors that might be the subject of a collusion is built. When all of the Γ-symbols in the altered fingerprinting word have been analyzed in this manner, an m×L, (where m is the number of Γ-symbols or colors, i.e. m=2c) matrix is defined that contains an indication of which colors might be the subject of a collusion for each of the Γ-symbols in the altered fingerprinting word. The fingerprinting word for each of the users or entities is then compared with the matrix. Specifically, each Γ-symbol of the user's fingerprinting word is compared with the set of likely colors for the corresponding Γ-symbol of the altered fingerprinting word. If the user's Γ-symbol coincides with one of the colors in the set, then a counter is incremented. If there is no coincidence, then the counter is not incremented and the next Γ-symbol for the user is checked. This process continues until all of the Γ-symbols for all of the users have been checked. At this point in the process, all of the users will have a value associated with their counter. The most likely colluder is the user that has the highest counter value.

Figure 6:
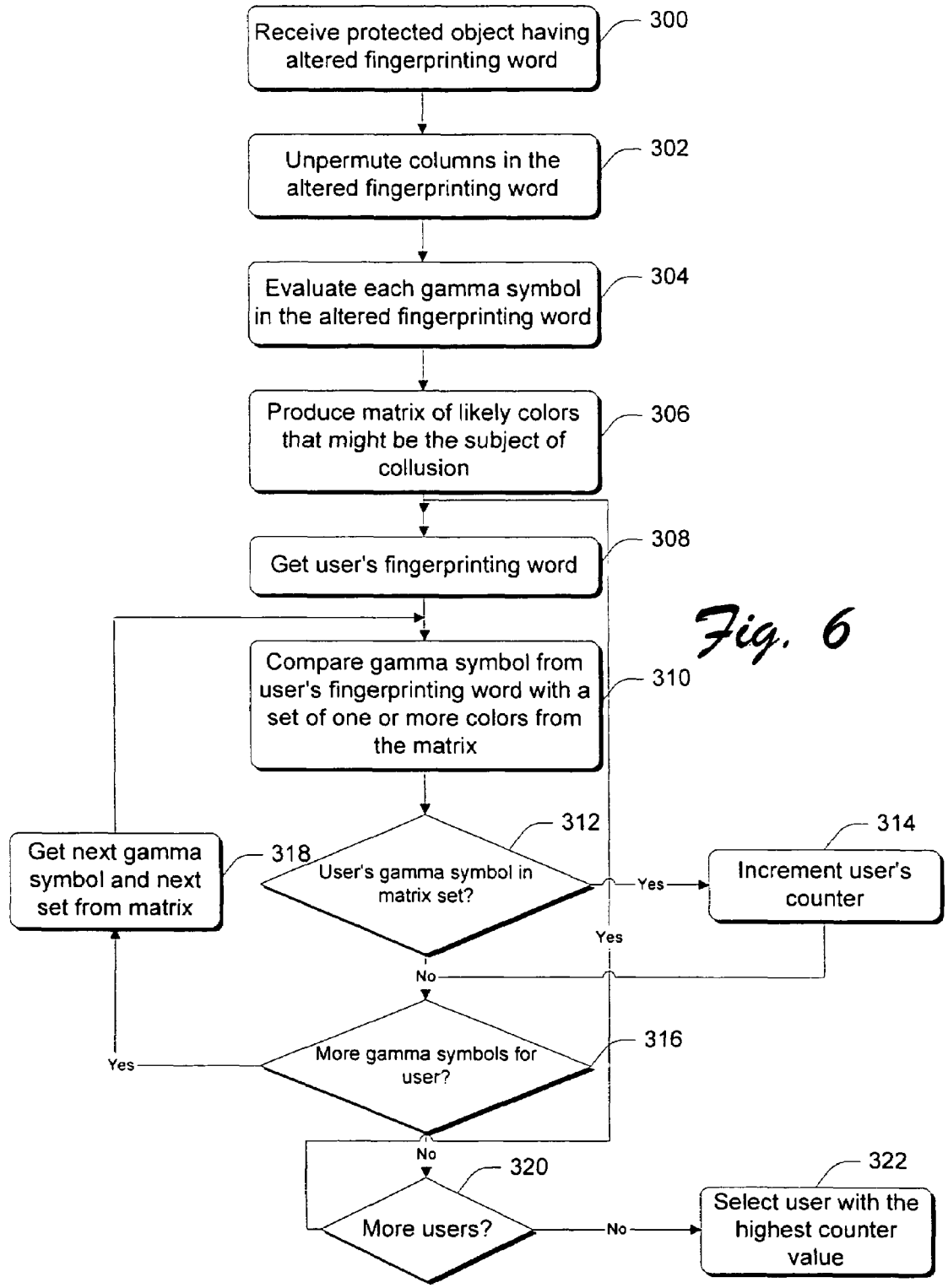
FIG. 6 is a flow diagram that describes steps in a detection method in accordance with the described embodiment.

FIG. 6 shows a flow diagram that describes steps in a detection method in accordance with the described embodiment. Step 300 receives a protected object that has a fingerprinting word that has been altered by a user or entity. Step 302 unpermutes the columns (at the chip level) of the altered fingerprinting word. Step 304 evaluates each of the Γ-symbols in the altered fingerprinting word. In the described embodiment, each of the Γ-symbols is evaluated by applying Algorithm 3 (above) to the Γ-symbol. Application of Algorithm 3 produces a matrix (step 306) of likely colors that might be the subject of a collusion. Production of the described matrix takes place by selecting a Γ-symbol if the weight of a block satisfies a predefined relationship that is specified, in this example, by Algorithm 3. Step 308 then gets the first user's fingerprinting word and step 310 evaluates the user's fingerprinting word by comparing the first Γ-symbol in the user's fingerprinting word with a set of one or more colors from the matrix. In the described embodiment, the matrix has L columns, each of which corresponds to a different Γ-symbol of a fingerprinting word. For any one column, there is a set of one or more colors that are produced by Algorithm 3. Each of the produced colors in a column are used for comparison with a corresponding Γ-symbol in a user's fingerprinting word. This will become more apparent in the example that is given below. Step 312 determines whether the user's particular fingerprinting word Γ-symbol coincides with one of the colors in the set of colors for the corresponding column in the matrix. If there is a coincidence, then step 314 increments the user's counter. If there is not a coincidence, then step 316 determines whether there are any additional Γ-symbols for the user. If there are, then step 318 gets the next Γ-symbol and loops back to step 310. If there are no additional Γ-symbols for the user, then step 320 determines whether there are any additional users. If there are additional users, then the method loops back to step 308 and gets the new user's fingerprinting word. If there are no additional users, then step 322 selects the user with the highest counter value and incriminates them as a colluder.

As an example to assist in understanding the above-described process, consider the following elementary example using the following Γ-code:

| Color | Γ symbol |
|-------|----------|
| 1 | $\Gamma_1$ |
| 2 | $\Gamma_2$ |
| 3 | $\Gamma_3$ |
| 4 | $\Gamma_4$ |
| 5 | $\Gamma_5$ |
| 6 | $\Gamma_6$ |

Assume that each fingerprinting word has a length L that, in this example, is five Γ-symbols long. Applying Algorithm 3 to each of the five Γ-symbols might yield the following matrix:

| | Matrix | | | | |
|---|---|---|---|---|---|
| Color | Implicated C lor $\Gamma_1$ | Implicated Col r $\Gamma_2$ | Implicated Color $\Gamma_3$ | Implicated Col r $\Gamma_4$ | Implicated Color $\Gamma_5$ |
| 1 | | X | X | | |
| 2 | X | | | | |
| 3 | X | | X | X | |
| 4 | | | | | X |
| 5 | | X | | | X |
| 6 | | | X | | X |

Here, each of the last five columns corresponds to an individual Γ-symbol in the altered fingerprinting word and contains a number of "X" marks. Each "X" indicates, for a particular Γ-symbol, a color that might be the subject of a collusion. Each Γ-symbol in the altered fingerprinting word has a set of one or more colors associated with it. In this example, for the first Γ-symbol in the altered fingerprinting word, colors 2 and 3 might be the subject of the collusion. For the second Γ-symbol in the fingerprinting word, colors 1 and 5 might be the subject of the collusion, and so on. After this matrix is defined, each user's fingerprinting word is compared, Γ-symbol by Γ-symbol, with the implicated colors for each of the corresponding Γ-symbols in the matrix. This comparison is summarized in the table that appears below:

| User 1 Fingerprinting word | 1 | 1 | 4 | 6 | 5 |
|---|---|---|---|---|---|
| Counter 1 | 0 | 1 | 1 | 1 | 2 |
| User 2 Fingerprinting word | 2 | 5 | 3 | 3 | 4 |
| Counter 2 | 1 | 2 | 3 | 4 | 5 |

Here, there are two hypothetical users designated user 1 and user 2. Each user has a unique fingerprinting word that is represented numerically by its constituent colors. For example, the fingerprinting word for user 1 is as follows [(color 1) (color 1) (color 4) (color 6) (color 5)]. This can also be represented as ($\Gamma_1 \Gamma_1 \Gamma_4 \Gamma_6 \Gamma_5$). To determine which of the two users is incriminated in this example, each of the user's Γ-symbols or colors is checked against the corresponding incriminated colors for the corresponding Γ-symbol in the matrix above. If the user's Γ-symbol is found in the matrix, then the user's counter is incremented for that Γ-symbol. Thus, for user 1, its first Γ-symbol is defined by color 1. Reference to the matrix indicates that, for the first Γ-symbol, color 1 is not incriminated. Accordingly, the user's counter is not incremented. For user 1's second Γ-symbol, (defined by color 1) however, color 1 is among the set of colors that are implicated for the second Γ-symbol of the altered fingerprinting word. Accordingly the counter is incremented by one. Similar analysis continues for each of the remaining Γ-symbols, and for each of the remaining users. After all of the users have been checked against the matrix, the user with the highest counter value (right most counter column) is selected as a colluder. In this example, user 2 has the higher of the counter values because there are more coincidences between its fingerprinting word and the incriminated colors of the matrix.

The methods and systems described above can greatly increase the number of colluders that can be defended against over the number enabled by the Boneh-Shaw system. For example, assume that a movie has around $10^{10}$ pixels and that 10% of the pixels are significant enough so that data can be hidden in them. This means that $10^9$ chips can be utilized in connection with this movie. Assuming that there are $N=10^6$ users and an error rate of $10^{-3}$ is desired, then the number of colludes that can be defended against is c=78. Note that with the above parameters we still may accuse about 1000 entities, where there are only 78 colluders. Hence accusations should take place only with those repeatedly incriminated. However, the number 78 compares favorably with c=4 for Boneh-Shaw. Being able to defend against more colluders increases the breadth of protection and desirably makes it much more difficult for fingerprinting words to be altered. The required value of parameter d is $d=2c^2*\log(8cL/\epsilon)$.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. One or more protected digital objects embodied on one or more computer-readable media, individual digital objects being embedded with at least one fingerprinting word produced in accordance with a method comprising:
    defining a plurality of fingerprinting words, each fingerprinting word being unique and containing at least one spread sequence, wherein each fingerprinting word contains a plurality of Γ-symbols, each Γ-symbol contains 2c-1 spread sequences, where c is the number of colluders that are desired to be defended against; and
    assigning individual fingerprinting words to individual respective entities, the fingerprinting words serving to identify an entity to which it is assigned;
    said fingerprinting words being structured to permit a collusion analysis to ascertain identities of potential colluders who change an associated fingerprinting word.

2. The one or more protected digital objects of claim 1, wherein at least one digital object comprises a document.

3. The one or more protected digital objects of claim 1, wherein at least one digital object comprises a video object.

4. The one or more protected digital objects of claim 1, wherein at least one digital object comprises a music object.

5. One or more protected digital objects embodied on one or more computer-readable media and produced in accordance with a method comprising:

defining a plurality of fingerprinting words, each fingerprinting word being unique and containing at least one spread sequence, wherein each fingerprinting word contains a plurality of Γ-symbols, each Γ-symbol containing 2c-1 spread sequences, where c is the number of colluders that are desired to be defended against, said fingerprinting words being structured to permit a collusion analysis to ascertain identities of potential colluders who change an associated fingerprinting word;

assigning individual fingerprinting words to individual respective entities who constitute potential colluders, the fingerprinting words serving to identify an entity to which it is assigned; and embedding at least one fingerprinting word in at least one digital object.

6. The one or more protected digital objects of claim 5, wherein at least one digital object comprises a document.

7. The one or more protected digital objects of claim 5, wherein at least one digital object comprises a music object.

8. The one or more protected digital objects of claim 5, wherein at least one digital object comprises a video object.

9. A Γ-code data structure configured for use in an embedding process for protecting digital data, the Γ-code data structure comprising:

a memory;

a plurality of spread sequences in the memory, the spread sequences being arranged in blocks that are combinable to define fingerprinting words that are assignable to individual entities to which protected objects are to be distributed, wherein the blocks are combinable to define individual Γ-symbols, each Γ-symbol comprising 2c-1 blocks, where e is the number of colluders that are desired to be defended against; and said fingerprinting words being structured to permit a collusion analysis to ascertain identifies of potential colluders who change an associated fingerprinting word.

10. One or more protected objects comprising:

digital data embodied on one or more computer-readable media; and a fingerprinting word embedded in the digital data, the fingerprinting word containing at least one spread sequence, the fingerprinting word being associated with an entity to which the object is to be, or has been distributed, wherein the fingerprinting word contains a plurality of Γ-symbols, wherein each Γ-symbol contains a plurality of spread sequences, wherein each Γ-symbol contains 2c-1 spread sequences, where c is the number of colluders that are desired to be defended against;

said fingerprinting word being structured to permit a collusion analysis to ascertain one or more identifies of potential colluders who change the fingerprinting word.

11. The one or more protected objects of claim 10, wherein each fingerprinting word contains the same number of Γ-symbols.

12. The one or more protected objects of claim 10, wherein at least one object comprises a document.

13. The one or more protected objects of claim 10, wherein at least one object comprises a music object.

14. The one or more protected objects of claim 10, wherein at least one object comprises a video object.

15. One or more computing devices embodying the one or more protected objects of claim 10.

* * * * *